US008811959B2

(12) United States Patent
Conner et al.

(10) Patent No.: US 8,811,959 B2
(45) Date of Patent: Aug. 19, 2014

(54) BLUETOOTH ENABLED CREDIT CARD WITH A LARGE DATA STORAGE VOLUME

(75) Inventors: Finis Conner, La Quinta, CA (US); An Van Le, Austin, TX (US); Anil Nigam, Saratoga, CA (US)

(73) Assignee: Conner Investments, LLC, Carmel, CA (US)

( * ) Notice: Subject to any disclaimer, the term of this patent is extended or adjusted under 35 U.S.C. 154(b) by 39 days.

(21) Appl. No.: 13/418,641

(22) Filed: Mar. 13, 2012

(65) Prior Publication Data

US 2013/0065564 A1   Mar. 14, 2013

Related U.S. Application Data (60) Provisional application No. 61/452,499, filed on Mar. 14, 2011.

(51) Int. Cl.
*G06F 7/04* (2006.01)
*H04W 4/00* (2009.01)

(52) U.S. Cl.
USPC ...................................... 455/414.1; 340/5.82

(58) Field of Classification Search
USPC ............. 455/414.1–414.3, 550.1, 556.1–558; 726/16–21
See application file for complete search history.

(56) References Cited

U.S. PATENT DOCUMENTS

| 2004/0235514 A1* | 11/2004 | Bloch et al. ................ 455/550.1 |
| 2006/0170530 A1* | 8/2006 | Nwosu et al. ................ 340/5.53 |
| 2010/0275259 A1* | 10/2010 | Adams et al. .................... 726/19 |
| 2010/0312698 A1* | 12/2010 | Bonalle et al. .................. 705/41 |

OTHER PUBLICATIONS

International Search Report for patent application PCT/US2012/28953 (Jul. 6, 2012).
Jain et al., "Integrating Bluetooth, Biometrics and Smartcards for Personal Identification and Verification," Proceedings of National Symposium on Emerging Trends in Networking and Mobile Communication, Chandigarh, India, (Sep. 2003).

* cited by examiner

*Primary Examiner* — Kashif Siddiqui
(74) *Attorney, Agent, or Firm* — Polsinelli PC (57) ABSTRACT

A smart card is disclosed which includes a mass storage memory for storing biometric information of a user and private data. A radio is used as an interface to the card. When the user of the card wishes to invoke an application for the private data, biometric information about the user is provided to a device in communication with the card, enabling the card to authenticate the user as an authorized user of the private data, and in response to that authentication provide the data to the application in a manner that maintains privacy and integrity of data.

18 Claims, 6 Drawing Sheets

BLUETOOTH ENABLED CREDIT CARD WITH A LARGE DATA STORAGE VOLUME

CROSS-REFERENCE TO RELATED APPLICATION

This application claims priority to U.S. Provisional Application 61/542,499, filed Mar. 14, 2011, entitled "Bluetooth Enabled Credit Card with a Large Data Storage Volume," which is incorporated herein by reference in its entirety.

BACKGROUND OF THE INVENTION

The common credit card provides some data storage. Most people carry some of these in their wallets. The magnetic stripe on the back of the card, just above the signature panel, has three tracks that contain recorded information. The three tracks store 553 bits, 200 bits and 535 bits. To complete a purchase using a credit card, information from the tracks is read as the card is swiped through a reader mechanism. The purchase price is credited or debited against the recorded user's account and banking information. Certain cards such as identification, driver license, library, and loyalty cards encode information in these tracks to enable owner identification and the delivery of services.

One class of credit cards known as smart cards contain an integrated circuit (IC) with as much as a megabyte (MB) of electrically erasable and programmable memory. Some of these cards use an 8 pad connector to exchange information with a special reader when the card is installed in this mechanism. These cards typically conform to international standard ISO 7816 and communicate at data speeds of about 115 kilobits per second.

Another class of IC cards use a coil embedded in the card to exchange information using the 13.56 MHz frequency band with a special reader. These are known as "non-contact" cards. The cards obtain electric power from the reader as magnetic radiation, and the coil in the card converts this to current to power the electronic circuits in the card. An example of this type of card is the MIFARE card. These cards conform to international standard ISO/IEC 14443 and for the exchange of information to occur reliably must operate at a distance of less than about 10 centimeters from the reader. The data exchange rate is about 106 kilobits per second.

Another class of proximity cards conforming to ISO/IEC 15693 operates at larger distances, up to about 1.5 meters. The strength of the magnetic field at these distances, however, is much smaller, reducing the data transfer rate. The result is that only small amounts of information can be exchanged during a transaction. All of these smart cards require a reader to be installed at the point where a financial transaction is made or a service delivered.

U.S. Pat. No. 7,526,555 teaches a method to authenticate a user employing a Bluetooth transceiver embedded in a Smart Card such that the user's files are printed at a specific station. The art described in this document does not teach methods to incorporate a high capacity data storage memory module in the card or power management to allow large amounts of data to be transmitted during the execution of a transaction.

A paper titled "Integrating Bluetooth, Biometrics and Smartcards for Personal Identification and Verification," authored by Vivek Jain and Ramesh C. Joshi was presented at the Proceedings of National Symposium on Emerging Trends In Networking and Mobile Communication, Chandigarh, India, Sep. 5-6, 2003. This document describes a card that contains 32 kilobytes of data storage with a Bluetooth integrated circuit and a thin battery embedded in the card. The document does not teach a large data capacity storage module or power management. Nor does it provide an independent means for maintaining integrity and authenticity of stored information.

BRIEF SUMMARY OF THE INVENTION

With the growth of digital data and electronic commerce more information is required to achieve appropriate levels of security during financial transactions. Identification of the card owner is often required. Herein a credit card arrangement is presented. The card contains an integrated circuit with a large and secure data storage volume of greater than 10 MB. The card enables applications such as portable personal health records and secure data transport in a convenient and popular form factor. Additionally, cards of this disclosure communicate using Bluetooth at significantly faster data speeds than the prior art cards described above. Bluetooth is a ubiquitous non-contact communication interface and is available in personal computers, mobile phones, tablet computers and many other appliances. Consequently, the card of this disclosure does not require a unique reader mechanism for its operation. This feature is particularly valuable, for example, during a personal medical emergency where the user's health data can be read from the card universally such that appropriate medical care can be provided.

By creating a secure personal area network, Bluetooth wireless technology allows exchanging data over distances of on the order of 30 meters. Using short wavelength radio transmissions from fixed and mobile devices, Bluetooth is managed by a private, not-for-profit trade association known as the Bluetooth Special Interest Group (SIG). This SIG is supported by more than 13,000 member companies who participate in various working groups. These groups produce standardization documents and oversee the qualification of new products. Bluetooth operates in the unlicensed industrial, scientific and medical 2.4 GHz short range radio frequency band employing a technique known as frequency-hopping spread spectrum (FHSS). In FHSS data being transmitted is divided into "chunks" and sent using 79 different frequencies in the range of 2,400 to 2,483.5 MHz. A Bluetooth enabled smart card requires a power supply resident on the card. Batteries are available that provide a two year life to the card depending upon the work load.

DETAILED DESCRIPTION OF THE INVENTION

Figure 1:
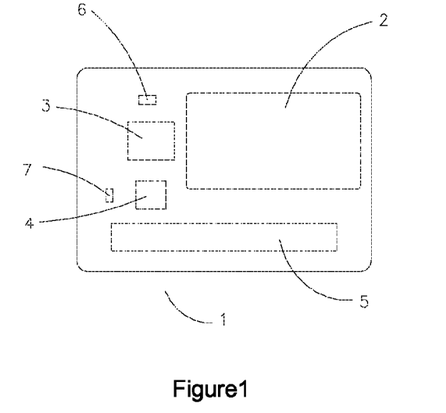
FIG. 1 illustrates a plan view of a card.
Figure 2:
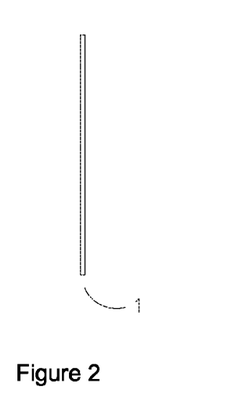
FIG. 2 is a side view of the card in FIG. 1.
Figure 3:
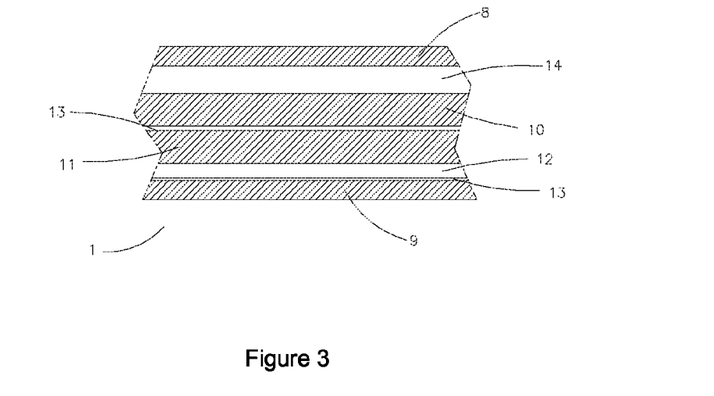
FIG. 3 is a cross-sectional view through a battery compartment in the card.

FIG. 1 illustrates in plan view a card 1 of this disclosure. In a preferred embodiment, the dimensions of the card are about 85.6 mm long, 53.98 mm wide and 0.76 mm thick. FIG. 2 shows the card in side view. FIG. 3 is an expanded cross-sectional view taken through a portion of the card containing a battery.

The card 1 has a base layer 9 and a top layer 8 as shown in FIG. 3. These layers are preferably polycarbonate, polystyrene or equivalent sheet materials. The top 8 and bottom layer 9 of card 1 can be printed with artwork as desired. Card 1 contains a battery compartment 2 where two batteries 10 and 11 are installed, mounted one on top of the other, as also shown in FIG. 3.

The batteries are preferably commercially available products, e.g. part number MEC102 provided by Infinite Power Solutions, Littleton, Colo. Battery 11 is mounted to a flexible substrate 12 with electrical inter-connections. Spaces 13 and 14 are filled with plastic to provide a smooth flat surface to attach the top 8 and bottom 9 layers to the card. They also provide a large surface area to prevent delamination with use. In this embodiment, each battery is rated for 2.5 milli-ampere-hour (mAH) and can supply 100 milli-amperes (ma) of current. The batteries are about 25.4 mm×50.8 mm×0.17 mm, and when stacked together occupy about 0.4 mm of thickness of the card. The two batteries connected in parallel provide 5 mAH. If the electronics on the card consumed, for example, 45 milli-amperes, a transaction using the card could last about 400 seconds. Assuming they are charged to 75% of capacity, for a typical transaction the maximum duration would be 300 seconds or 5 minutes. At Bluetooth data transfer rates of 1.5 Mbits per second, the 5 minutes allow about 56 Mbytes of data to be transacted.

An alternate battery pack, manufacture's part number PGEB0053559, is available from PowerStream, West Orem, Utah. The dimension of this battery is 0.5 mm×35 mm×59 mm and it is rated for 65 mAH. When using this battery only a single cell is required, and longer data transaction periods are possible. Both batteries described above are rechargeable, enabling an increase the amount of data exchanged per transaction, as well as the usable life of the card.

Battery 10 and 11 can be recharged autonomously via integrated energy harvesting, using technology such as piezoelectric films, RF antennas or flexible photovoltaic films. Area 5 provided in card 1 contains the recharge mechanism. In a preferred embodiment a piezoelectric bender element polarized in the cantilever mode is utilized. As the card is carried in the wallet or user clothing, bending of the card will deflect the piezoelectric element generating voltage. This voltage can trickle charge the battery. Additionally, by fanning the card electrical charge can be generated and the battery charged similar to a self winding mechanical watch. Thus, if battery power is low a fanning operation can be used to complete a transaction.

Figure 8:
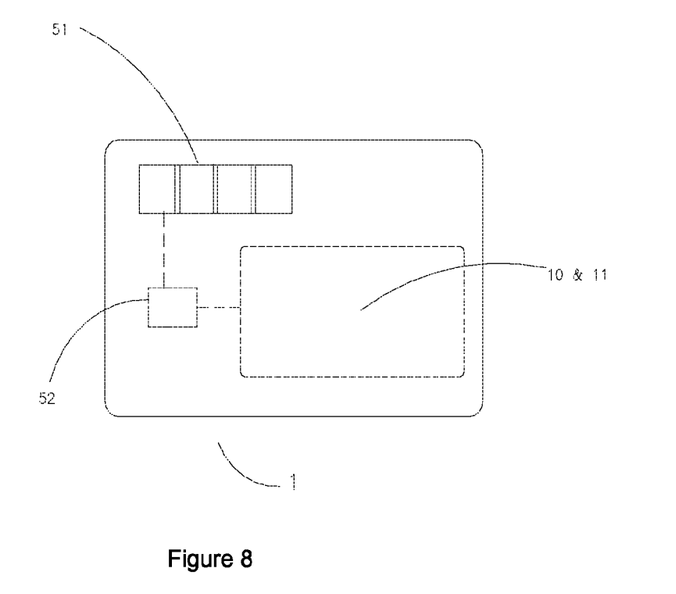
FIG. 8 is a diagram of a card with a solar cell.

In another preferred embodiment a coil can be embedded in Card 1. The coil acts as an inductor to pick up electromagnetic radiation. The electronics on the card these uses these signals to trickle charge the battery. Other embodiment consist of both the piezoelectric element and the coil embedded in Card 1. Alternatively, in another embodiment (shown in FIG. 8), a solar cell array 51 is built into the card. This solar panel with suitable electronics 52 can charge battery 10 and 11 during the useable life of the card.

Returning to FIG. 1, the electronic components 3, 4, 6 and 7 are mounted to flexible substrate 12 with electrical connections among these components and the recharge mechanism. In a preferred embodiment memory module 3 is a semiconductor flash integrated circuit. Current fabrication technology provides 8 GB storage capacity with NAND flash in a die size of 135 mm². Fabricated from a 300 mm or a 200 mm wafer, the circuit will have a thickness of about 750 microns.

Figure 4:
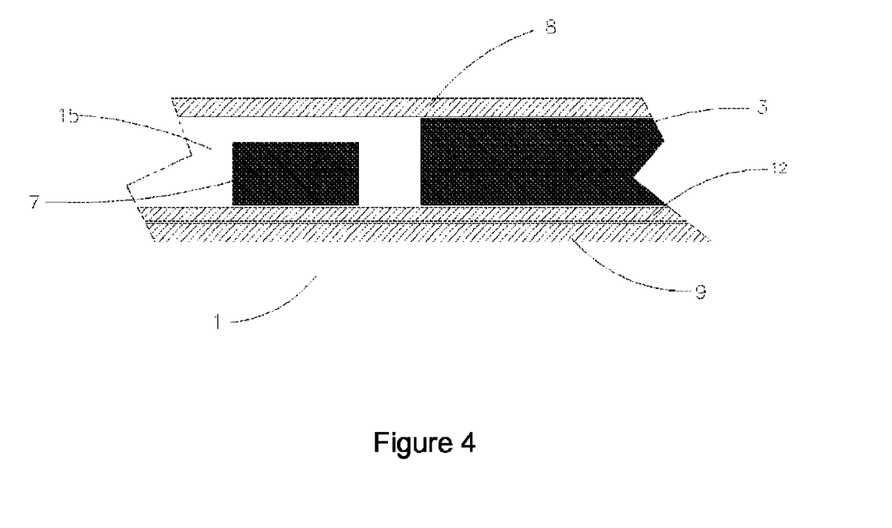
FIG. 4 is a cross-sectional view through a memory integrated circuit located in the card.

Card 1 is intended for burst operation and consequently heat dissipation from the memory chip or other integrated circuits, is not an issue. As a result, the die can be ground to about 450 microns in thickness. This thin die can be mounted on the flexible substrate 12 as shown in FIG. 4. Other embodiments consist of NOR flash or phase change memory dies with different sizes and storage capacities of tens of megabytes and larger.

Communications interface, transaction security, general microprocessor functionality, "wake-up" logic, power management and radio modulation are preferably provided as a single integrated circuit. Of course other embodiments can use multiple circuits to provide this functionality.

Appropriate discrete devices 7 and oscillator 6 are also mounted to the flexible substrate 12. The volume 15 can be filled with plastic or can consist of a hot laminate structure made from a number of plastic sheets with suitable thicknesses to fill the space and create a flat surface for top layer 8. This enables the top layer to be laminated maximizing the contact area to prevent these films from delaminating with use.

Figure 5:
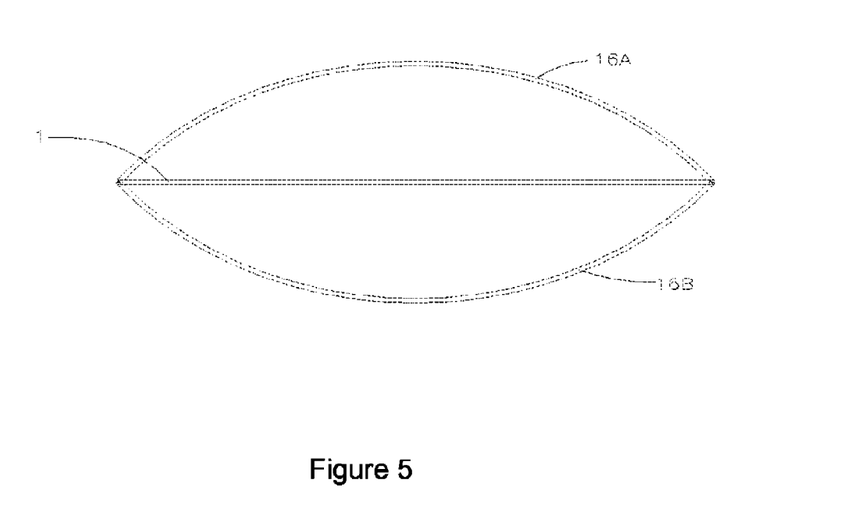
FIG. 5 illustrates flexibility of the card.

Card 1 if carried in a wallet or in clothing or if the fanning operation is employed to recharge the battery, the card could take a deflected shape as shown in FIG. 5. ISO 7816 specifies the deflection limits for Card 1, illustrated as positions 16A and 16B in the figure. The plastic layers described above for use in card 1 deflect without creating excessive internal stresses. In addition the integrated circuits 3 and 4 and discrete elements 6 and 7 can be vulnerable to cracking. The burst operation characteristics of the product allow these units to be ground to a thickness such that stresses remain small and below the breaking threshold. Alternatively, circuits 3 and 4 can be attached using conductive epoxy to provide flexibility in the attachment to substrate 12, thereby reducing deflection of the die and the accompanying stress levels.

Figure 6:
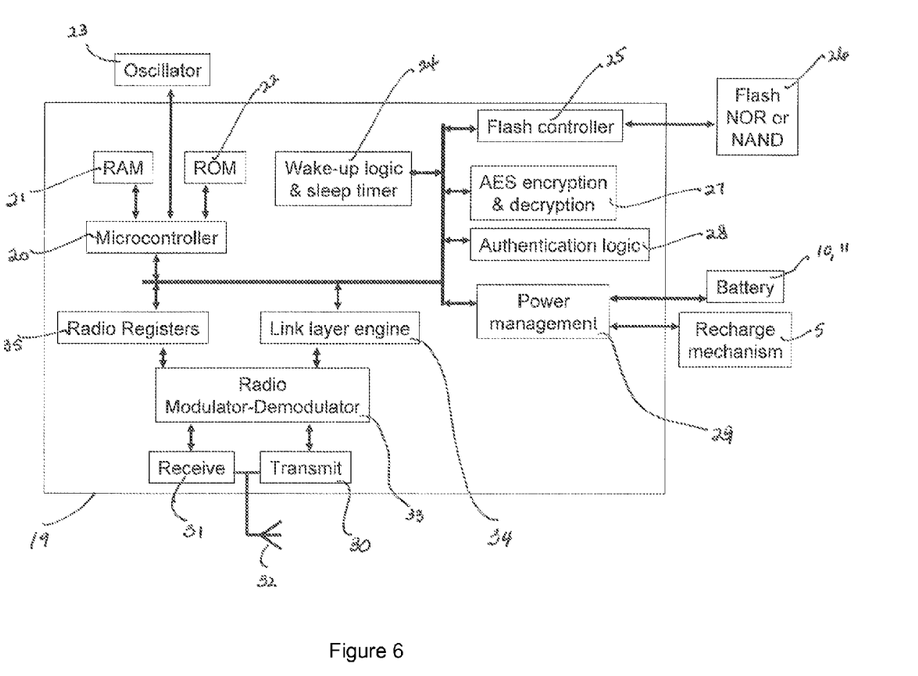
FIG. 6 is a circuit block diagram of the card.
Figure 7:
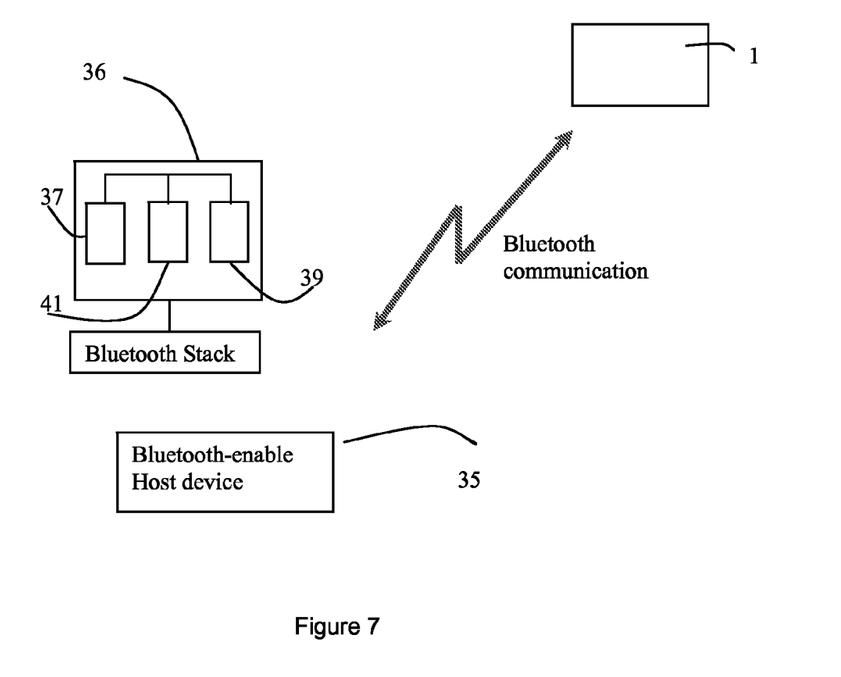
FIG. 7 is a block diagram of a Bluetooth-enabled host device.

FIG. 6 is a block diagram of the electronics resident on card 1. Microcontroller 20 is preferably an 8051 or an ARM processor—8 bit or 32 bit—depending on desired features, performance and cost. Control firmware resides in read-only memory 22. Dynamic random access memory 21 stores variables and provides scratch memory space. In a preferred embodiment RAM 21 is a non-volatile read/write memory which is predominately in an "off" state. Oscillator 23 and wake-up and sleep timer logic 24 then controls the power to the electronics.

Residing predominantly in the "off" state, card 1 powers up only when information is requested. Service hand-shake activity is used to establish a personal area network. Data storage is either in NAND or NOR flash circuit 26, having either a serial or parallel interface with flash controller 25. Because it improves reliability in reducing the likelihood of a trace breaking, a serial interface minimizes the number of inter-connects and is preferred. In implementations requiring more data handling, a parallel interface provides faster data through-put.

Encryption engine 27 is used to encrypt data transmitted from card 1 to the external host. Authentication logic 28 allows card 1 to establish a secure link with the external host and satisfy security conditions for a transaction. Although the Bluetooth communication protocol provides encryption for transmitted data, in the preferred implementation, we chose not to rely on Bluetooth protocols to protect application data transmitted to and from the card. The encryption strength provided by Bluetooth is insufficient to meet the security requirements of some applications which require a symmetric encryption algorithm different from the algorithm(s) provided by Bluetooth.

Physical security can be provided in preferred embodiments via hardened epoxy coatings applied to the complete packaging or to relevant components or data paths in the card 1. This helps protect sensitive information such as cryptographic keys and biometric templates. This tamper-proof protection can be implemented such that if an adversary attempts to peel off this coating for probing, the packaging would be destroyed rendering it useless. In other embodiments where cost is an important consideration the tamper-proof physical security is applied only to the encryption engine 27, which contains a small amount of non-volatile storage to store a cryptographic key referred to as the master storage key. Sensitive data is encrypted using the master storage key and stored in unprotected memory module 3. This implementation represents a trade-off between cost and performance because every time encrypted information is accessed from memory module 3, it must pass through encryption engine 27 for decryption using the master storage key.

Power management 29 circuit contains logic to power specific logic blocks in card 1. It is an objective of this architecture to minimize current draw from battery 10 and 11 and operate in the lowest energy state to maximize battery life for a transaction. As mentioned earlier, card 1 is in the powered down state a majority of the time, with transactions be provided is a burst mode.

Figure 9:
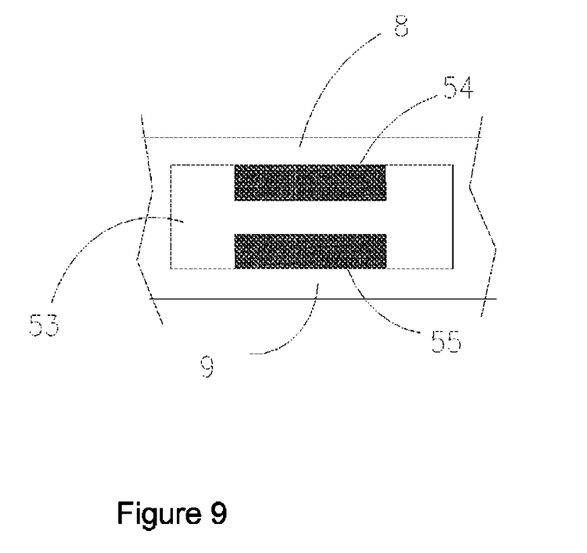
FIG. 9 is a cross-sectional view of a power switch in the card.

In another embodiment shown in FIG. 9, a switch 53 is fabricated in the card to control the power supplied by the battery. This switch uses mechanical contact 54 attached to the top layer 8 and contact 55 attached to the bottom layer 9. The switch is activated when the user depresses region 56 of card 1 as shown in FIG. 10.

In other embodiments the switch may be implemented as a capacitive or thermal sensing unit, where proximity of the user's finger or body heat activates the switch. The advantage of using a switch is that battery power is used during a transaction only and at all other times the card is in the "off" state. In addition, greater security is achieved because the electronics remain inactive in this "off" state. This makes the card less vulnerable to a denial of service attack where an adversary attempts to use Bluetooth-enabled host devices to connect to the card, to prevent or delay the card's connection to an intended device.

Figure 10:
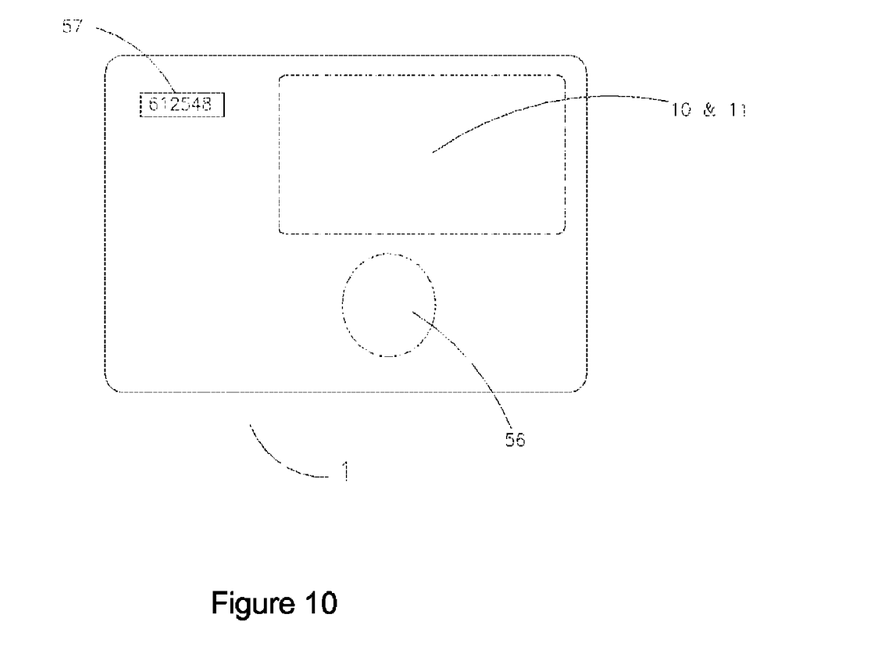
FIG. 10 is a diagram of the card having a fingerprint reader.

In another embodiment, also illustrated by FIG. 10, a display 57 is fabricated in the card. This display can be implemented as an E-ink unit or a dot matrix device. This display allows pin codes and passwords to be displayed during a transaction. Less expensive arrangements use a thin LED or an LED/display located in the host unit.

Figure 11:
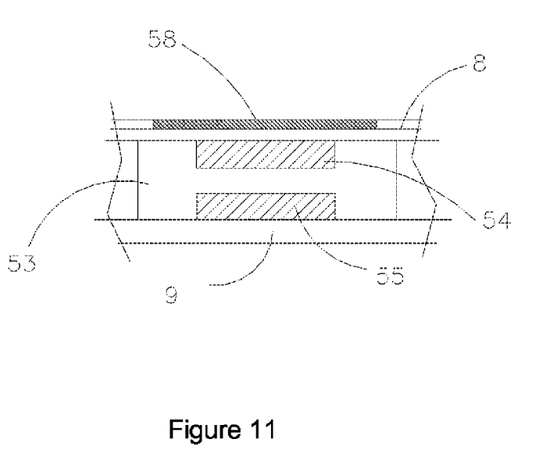
FIG. 11 is a cross-sectional view of another power switch.

In another embodiment switch 53 includes a thin fingerprint sensor, for example, one manufactured by e-Smart Technologies Inc. This sensor has a thickness of about 0.2 mm. As illustrated in FIG. 13, the sensor sheet 58 is fabricated in the top cover 8 such that when the user depresses switch 53, as the card powers up, the fingerprint pattern is detected. This pattern is compared with the stored template which was created when the card was issued. If a valid match is obtained, the transaction is allowed to proceed. If the match is invalid, then power is never supplied to the circuitry and card 1 remains inactive. To overcome the probability of false rejects the user can clean the Card to remove debris and retry or use another registered finger. A defined number of retries are allowed by the on-board firmware. A thin LED or other means, not shown in FIG. 11, provide a visual indication that the card is verifying the user's fingerprint.

Returning to FIG. 6, the analog Bluetooth radio blocks are frequency synthesizer, modulation and demodulation 33, the receiver 31, and the transmitter 30 circuits. Bluetooth antenna 32 is also embedded in Card 1. The link layer engine 34 and the radio registers 35 are managed by microcontroller 20.

As mentioned above, all of the control logic can be implemented as a single, mixed signal ASIC to attain the lowest bill of materials cost and to minimize the number of interconnects on the flexible substrate 12. In other embodiments the analog portions are separate chip from the digital logic. The digital logic includes the microcontroller 20, RAM 21, and ROM 22, which can be on a single integrated chip.

Other embodiments can include the storage memory 26 in the same digital logic chip to achieve the highest level of integration. This implementation reduces cost and minimizes interconnections among the electronic blocks. In addition to executing the on-board firmware stored in ROM 22, the microcontroller 20 also fetches the firmware stored in storage memory 26, loading it into the RAM 26 and executing it. The firmware stored in storage memory 26 consists of software code for multiple applications authorized by the card issuer to run on the card. These applications may have been developed and tested after manufacture of the card.

There are well-known mechanisms for installing the firmware for an authorized application on storage memory 26 after the card has been manufactured and issued to a user. This mechanism involves the generation and verification of the digital signature produced on the firmware and attached to the firmware when it is distributed. In the context of this invention, the entities that have significant roles are:

Card issuer—This organization acquires the smart cards, personalizes them with information, for example, the biometric templates of individual users, and issues the cards to the individual users. It is assumed that when a card issuer acquires the smart cards, the cards already contain the functionality desired by the card issuer. An example of a card issuer is a government agency that acquires cards for providing electronic passport features, and issues the cards to citizens and residents of its country.

Service Provider—This entity is authorized by the card issuer to provide services to users of the card. An example of a service provider is a bank that provides an electronic purse application enabling users to use their cards to purchase products. Although the firmware for some of these applications may have been developed and incorporated on the cards prior to card issuance, some later developed applications are expected to be installed by the user after the cards have been issued. To install the application after card issuance and provide service to cardholders, the application firmware usually will have (a) an attached digital signature produced on the firmware by the service provider, and (b) an attached public key certificate of the service provider, signed by the card issuer and certifying that the service provider is authorized to develop applications for the card 1. That is, the digital signature on the firmware is signed by the private key of the service provider, whose the corresponding public key certificate is, in turn, signed by the private key of the card issuer and attached to the firmware as well.

Note that there are circumstances where the digital signature on the firmware of an application developed by a service provider is signed directly by the card issuer. Here there is no need to attach the public key certificate of the service provider to the firmware. From the application installation point of view, these cases are treated as if the firmware of the application is developed by the card issuer.

Cardholder—A cardholder is a user who carries his card. It is unlikely that a card issuer will allow end users to develop their own application firmware and install it on the card. If, however, a card issuer, or a service provider, allows cardholders to configure aspects of their card special circumstances arise, and these are discussed below.

In many applications involving smart cards or other forms of security tokens, one of the required first steps is for the user of the card (or the security token) to authenticate him/herself to the card to prove that he/she is the authentic user of the card. This authentication often involves a two-step process—(a) presenting the card by inserting it into a conventional smart card reader or if the card is a contactless smart card, passing it near a contactless reader, and (b) verification of a PIN or a password. This approach is referred to as a 2-factor authentication: something you have (the card), and something you know (the PIN or password). Sufficient storage to store fingerprint templates for the purpose of biometric fingerprint verification enables a three-factor test; one which includes "something you are"—the fingerprint.

The use of a PIN or password in smart card authentication can create problems. For example, a user may choose a PIN or password that is easy to remember, unfortunately rendering it easy to guess when the card is lost or stolen. Or the user may write down the PIN or password on the card itself or on a piece of paper in the wallet. Of course if the password is not easy to remember, the user may forget a non-trivial PIN or password. In addition, a PIN is vulnerable to being captured by rogue software such as a keyboard recorder. One objective of our system is to eliminate the use of PINs or passwords in smart card authentication by enabling multiple-factor biometric authentication in a systematic way. Although biometric verification is not precise, a combination of multiple-factor biometric verification improves the reliability of biometric authentication, making it possible to eliminate PIN and password-based authentication approaches.

As is standard practice in the smart card industry, card 1 has a unique identifier, referred to as the card ID, assigned at manufacturing time and contained in the ROM 22. Also, after manufacturing, card 1 is initialized with certain cryptographic variables in a process referred to as the personalization or initialization process, which may occur prior to, or at the same time with, the process for enrolling the users' biometric information. The initialized cryptographic variables include a unique public and private key pair that the card generated itself, for use with a preferred public key algorithm (e.g., RSA or ECDH). The public key appears in the form of a public key certificate, which binds the public key to the card ID. The card's public key certificate contains a digital signature on most fields of the certificate, signed by the card issuer via the card issuer's private key. In addition, the card contains a root public key—the public key of the card issuer—whose value may be specified in ROM 22 to avoid unauthorized modifications, depending on the card issuer's preference. The card's public key certificate and its corresponding private key are essential for the card to be authenticated by another device.

In our preferred approach, prior to issuing a card to a user, the card issuer requires the user to enter an enrollment process whereby biometric characteristics of the user, such as fingerprints, iris patterns, facial recognition, voice recognition etc., are captured. The captured data of each biometric characteristic is then processed by an algorithm referred to as a feature extractor, and converted into a compact digital representation called biometric template. These biometric templates are stored in the card's memory module 3 (see FIG. 1). Each biometric template has an associated digital signature—usually produced by the card's issuer—that links the template to the card ID. This enables modifications to the card ID or the template to be detected. The biometric templates and the associated digital signatures are also stored in a central database for backup and other purposes.

If a user loses his card, the card issuer may use the backed up biometric templates from the central database to issue a replacement card. The card issuer also will update the digital signature associated with each template to reflect the new card ID, and its expiration date. It is up to the card issuer to decide when to update the biometric templates of the cardholder to take into consideration possible changes. For example, if the expiration period of the card is 4 years, the card issuer may require the cardholder to provide a new voice template and/or have a new picture taken when the card is expired. Then a new card will be issued to the cardholder with the updated biometric templates.

Preferably, when the card is used, the cardholder will be required to authenticate him/herself to the card by the biometric factors (e.g., fingerprints and iris), depending on the security requirements of the particular use. The application considers the cardholder as an authentic owner of the card only after the required biometric verifications are successful.

Herein, when an authentication involves more two or more factors of biometric authentication, it is referred to as a multi-factor biometric authentication. It is preferable that multi-factor biometric authentication involves different types of biometric features. For example, a two-factor biometric authentication that involves a verification of the index fingerprint and a verification of the facial feature is preferable over the fingerprint verification of two different fingers. Also, due to the imprecise nature of biometric verifications, a cardholder is typically allowed several attempts before a verification is considered failed. Thus for each type of biometric verification, a card issuer will specify an appropriate threshold failure value, which when exceeded, causes the verification to be considered failed. In other words, if the threshold failure value is 5 for the fingerprint verification, a cardholder can try 5 times before the card considers him not an authentic owner of the card and deactivates itself, pending appropriate action by a designated administrator. In our preferred embodiment, instead of deactivating itself when a threshold failure value is exceeded for a particular type of biometric verification, the card disallows any application from using this type of biometric verification until it is reset by a designated administrator. This allows other types of biometric verification to be used as appropriate.

In a biometric authentication to the card, the cardholder submits a live biometric feature (e.g., a fingerprint) to an authorized device, say, a terminal capable of capturing it. The captured feature is converted into a template and then compared to a corresponding biometric template stored on the card for a match. The biometric verification can be performed on the card itself or by the authorized device. In the former form of verification—often referred to as match-on-card verification—the captured and converted template is transmitted to the card for matching with a stored reference template. In the latter form of verification—often referred to as off-card or off-chip verification—the card retrieves a reference template from its storage and transmits it to the interface device for matching with the captured and converted template.

Techniques for verification of fingerprints and iris templates have improved significantly since over the last several years, and now are performed by high performance smart card processors. Obviously, a match-on-card verification is considered more secure than an off-card verification, as the former form of verification does not depend on verification results of an external device as to which the security is either not known or not guaranteed.

In an embodiment that has the fingerprint sensor associated with switch 53 (FIG. 11), it can be used to capture a cardholder's fingerprints for improved security and authentication. A smart card capable of capturing fingerprints provides a greater degree of security for an application than a smart card without that capability, as the former type of card does not depend on live fingerprint capture by an external device of which security may not be known or cannot be guaranteed. In a preferred embodiment, card 1 contains the fingerprint sensor and the match-on-card capability for iris and fingerprint templates.

Due to the large storage capacity card 1 offers, the card can be used for a wide range of applications, for example, from a national ID card to a medical records card to a payment transaction card. These different applications have different security requirements. Central to all these applications, however, are the high degree of security that the card offers through multi-factor biometric authentication, the abundance of storage for storing useful information accumulated during the lifetime of a cardholder, not just the lifetime of the card, and the convenience of use and the fast data transfer via the Bluetooth interface.

We classify Bluetooth-capable devices that interface with card 1 as follows, based on the level of trust and security:

(1) Class 1-devices: These are devices that are certified by the card issuer as tamper-resistant or tamper-proof. For example, in a government application where the card is used as an electronic passport and where multi-factor biometric authentication is required, a tamper-resistant terminal or kiosk equipped with cameras and sensors for capturing iris and fingerprints and placed at Immigration or Custom area of an airport would be classified as Class 1. In these devices, if an adversary attempts to tamper with the hardware or the software, the cryptographic keys will be zeroed out, rendering the devices inoperable. A class 1 device always has an accompanying public key certificate that is digitally signed by the card issuer or a designated authority. With this certificate, the card issuer essentially certifies that the device that bears this certificate is a trusted device that can be used to capture and/or verify biometric templates in the electronic passport application or other government applications that require highest levels of security.

(2) Class 2-devices: These are mobile devices that the card issuer has no control over, but which belong to the cardholder and can be trusted by the cardholder to perform tasks such as accessing a confidential document, or performing a fingerprint capture as part of a payment transaction. For example, an iPhone™ or iPad™ which belongs to the cardholder can be classified as a Class 2-device, which the cardholder can trust and use its camera to perform a facial recognition.

A government application that uses the card to control access to sensitive documents stored on the card would not trust a Class-2 device such as the cardholder's smart phone to assist in biometric verification. We use the phrase "assist in biometric verification" to refer to the Class-2 devices that capture live biometric features of a user and convert them into corresponding templates, to the Class-2 devices that supply the templates to the card for a "match-on-card" verification, and to the Class-2 devices that perform biometric verification and inform the card of the success or failure of the verification. This is because rogue software can be written and downloaded to a smart phone of a targeted cardholder to intercept the biometric templates captured on his smart phone. This rogue software can later transmit the intercepted templates to an adversary, who could be a friend or colleague of the targeted cardholder. If the adversary is able to steal the card, he can use the intercepted biometric templates to authenticate himself to the card and misuse it.

A cardholder may consider his own mobile device (smart phone, tablet, etc.) as a trusted device for capturing his own live biometric features and supplying it to the card for verification in certain applications, such as electronic payments via virtual credit cards or for accessing to his own confidential data stored on the card. Among the possible reasons are: The cardholder feels he has control over his mobile device and he does not share it with other users. Or, if the electronic payment method is via a virtual credit card, the use of biometric verification, albeit via the assistance of the cardholder's mobile device, already provides better security than existing credit cards. The security improvement increases several fold if the card itself has the match-on-card capability.

In the above discussion, an electronic payment method via virtual credit cards refers to the method where credit card account information (credit card number, expiration date, security verification code, billing address, etc.) is securely stored on card 1, and card 1 functions as if it is a conventional credit card.

(3) Class 3-devices: These are mobile devices that the card issuer has no control over, but which belong to a nationally recognized retailer or corporation. The owners of these devices may or may not provide security for the devices at a level comparable to the Class 1 devices. The Class 3 devices contain a public key certificate signed by the owner, whose public key certificate is in turn signed by the card issuer. Many users would consider their own mobile devices more trusted than devices belong to merchants, as there is greater potential for rogue merchants or rogue employees of merchants to plant spyware that intercept captured templates and other information of cardholders, and retain them for future misuses instead of discarding them after operation is completed.

(4) Class 4-devices: These are mobile devices that the card issuer has no control over, and which belong to smaller and local stores. Many users would consider Class-3 devices more trusted than Class 4-devices, as national retailers or corporations tend to worry more about their reputation than their smaller organizations.

Of course there are more ways for granularity for security classification of devices, and security ranking of devices can be subjective. Either way, a benefit of our system is allowing card issuers, service providers, and users, flexibility in configuring the security policy that governs the interfacing mobile devices in their respective applications.

Next we discuss governing of the security policy of card 1 from the perspective of card issuers. A card issuer, e.g. a government organization, may specify the following biometric authentication requirements for use of the card.

(1) Cardholder authentication to the card is via an N-factor biometric authentication, where N is an integer, e.g. 2, 3, or 4. For example if N=3 then 3 biometric verifications are required by the issuer for use of the card.

(2) Each of the N factors of biometric authentication can be defined as explicit, or defined as N of M, where M is the number of available types of biometric templates stored on the card. For example, if the card stores the following types of biometric templates: fingerprints, iris, facial, voice, and palm, then M=5. As a further example, this part of the requirements can be, for N=3:

(a) As explicit as: (i) fingerprint verification of the left index finger, verification is to be performed on the card, and live fingerprint capture must be performed by the card's sensor; (ii) iris verification is required, live iris scan must be supplied by an authorized interface device, and the iris verification is to be performed by the interface device; and (iii) facial verification is required, live facial features capture must be supplied by an authorized interface device, and the facial verification is to be performed by the interface device.

(b) Alternatively the requirements can be partially explicit and partly flexible. For example: (i) fingerprint verification of the left index finger is required, verification is to be performed on chip, and live fingerprint capture must be performed by the card's sensor; and (ii) the remaining biometric verifications can be any two of the following four types: iris, facial, voice, and palm (depending on the capability of the authorized interface device), and the verifications are to be performed by the interface device. For ease of reference, we refer to this example of requirements as ER1.

(3) Threshold failure value for each type of biometric authentication: When the number of successive failures exceeds the threshold value defined for a type of biometric authentication, no more trials are allowed for that particular type of authentication. In a preferred embodiment, each type of biometric authentication has its own threshold failure value to allow for fine granularity. To illustrate the use of the threshold failure values, consider the above example of requirements ER1:

(a) The first biometric authentication requirement explicitly specifies that the left index finger be authenticated by the card using the fingerprint sensor and the match-on-card capability. Assume the threshold failure value for fingerprint verification is 5. If the cardholder fails to authenticate his left index finger to the card in 5 consecutive trials, the card blocks any facilities of fingerprint verification from future use until the cause of the problem is examined and the blocked facilities are unblocked by a designated administrator. Also, since the first biometric authentication failed, the user is considered as having failed the authentication process and the interface device need not proceed to perform the remaining 2 biometric authentications.

(b) For the remaining 2 biometric authentications, assume iris and facial of the four supported types, the card transmits the reference iris and facial templates, and the corresponding threshold failure values, to the interface device, in a form that protects the privacy and integrity of the transmitted information. The interface device then performs the two biometric authentications on the user per the instructions from the card. If the threshold failure value of either the iris or facial authentication is exceeded, the interface device resorts to the next supported type of biometric authentication, e.g. palm authentication, until either the 2 remaining authentications complete successfully or the user fails all the supported types of biometric authentication.

(4) The authorized interface device typically has a security classification as Class 1 device, whose features are described earlier. The "N out of M" biometric verification discussed above provides the flexibility to handle circumstances where a biometric feature of the cardholder is temporarily or permanently unavailable, e.g. a cut index finger requires a bandage.

Although the above biometric authentication requirements may appear complex, a programmer usually can digitally encode such data in a few bytes of information and have it processed efficiently by a smart card processor. For ease of discussion, the digitally encoded value that represents the biometric authentication requirement is referred herein as the Biometric Requirements Vector (BRV). This value is loaded onto the card at enrollment time. As part of the issuing process the biometric templates are collected from a user when at a designated registration office to receive the card. Of course, the card issuer may later change the specification of the BRV. For flexibility, each application has its own BRV, although there will be overlap among the different choices. The card issuer may update or change the BRV for a government application by having cardholders download the new value, which is also accompanied by a digital signature produced by the card issuer.

Assume a cardholder attempts to change the downloaded BRV, for example, for an electronic passport application. Instead of a correct value that requires the interfacing terminal to be a Class 1-device (i.e., tamper-resistant and secure terminal), the cardholder changes it to a new value that states the interfacing terminal can be a Class 2-device. The modification to the downloaded BRV will be detected by the card as it receives the new value and verifies the digital signature on it. Mechanisms, such as a sequence number that indicate a newer version for the BRV, can prevent a rogue user from downloading an old, but once valid BRV.

For many security applications that utilize smart cards, the software that implements an application usually consists of multiple components: the firmware that runs on the smart card—referred to herein as on-card application, and the software that runs on a host device interfacing with the smart card—referred to herein as the host software. In some cases, there is additional software that runs on other supporting devices. An application is said to be authorized by the card issuer if the software components are digitally signed by the card issuer or a designated authority such as a service provider. This assures that only approved software can be installed on the card after the card has been issued to a user. Beside the electronic purse application mentioned earlier, other examples of these authorized applications include a payment application that uses the cardholder's credit card accounts for payments, and an application for controlling access to user's private data stored on the card. (The user's private data refers to non-official use data, e.g. a digital copy of the cardholder's will or a confidential document produced for and owned by the cardholder's employer.) A service provider may specify biometric authentication requirements for its authorized applications in the same way the card issuer specifies them for the card issuer's applications. Service providers can also perform updates of the BRV in the same manner the card issuer would, except that the digital signature on the BRV is produced by the service provider and accompanied by a public key certificate of the service provider—digitally signed by the card issuer.

In certain authorized applications, a cardholder may be allowed to specify and configure the security policy regarding biometric authentication. One example is an application that allows a cardholder to use the extra storage spaces on card 1 as a secure mobile drive to store the cardholder's own private information. In this situation, a cardholder may specify the biometric authentication requirements as follows:

(1) Cardholder authentication to card is via an N-factor biometric authentication, where N is a specific number such as 2, 3, or 4. For example if N=2 then 2 biometric verifications are required.

(2) Each of the N factors can be explicit, or can be N out of M, where M is the number of available types of biometric templates stored on the card. (This was described above.)

(3) Threshold failure value for each type of biometric authentication. (This was also described above.)

(4) The authorized interface device must have a security classification as Class 2 device or higher. If the cardholder does not have a companion mobile device, he may specify that the security classification of the interface device is Class 4 or higher—assuming the cardholder accepts the risk of allowing, say, an iPhone belong to a street vendor to capture his fingerprints for authentication.

The BRV representing the biometric authentication requirements are loaded onto the card by the cardholder. This can be done at the same time that the user downloads the authorized on-card applications to the card. If the BRV is not loaded before one of the authorized applications runs on the card, the application will stop executing when it detects that the BRV is either empty or invalid.

Similarly, the data or information that will be used in an application can be loaded onto the card by this time. For example, for the electronic payment application via credit card numbers, the cardholder needs to load information for the credit cards that he plans to use onto the card. The installation of the on-card app, the BRV, and other operational data (e.g., credit card numbers), onto the card can be done via a utility that runs on a desktop or mobile device. Beside representing the biometric authentication requirements when the card is used for an intended application, the BRV also represents the biometric authentication requirements that must be met before a cardholder can change the value of the current BRV to a new value.

The card issuer may decide to preinstall an approved on-card app at enrollment time or before, and a default BRV will be loaded onto the card at the same time. The default BRV contains specifications that facilitate the changing of its value by the cardholder at a later time, but it also reflects the base security features that the card has. For example, if the card has a fingerprint sensor and match-on-card capability, the default BRV will contain such specifications. If the card has neither features, then the default BRV will specify that one-factor biometric authentication be performed by an interfacing mobile device that also captures a live biometric template of the cardholder, and the interfacing mobile device can be a Class-4 device. Once the cardholder is authenticated by the card via the methods specified in the default BRV, he can change the BRV from the default value to a new value that specifies stronger biometric authentication requirements.

To facilitate implementation of BRV and other operational data for an on-card application, software is run on a Bluetooth-enable mobile device such as a laptop or a tablet. Any time a cardholder wants to change the BRV, then the cardholder runs the utility. As part of its intended functions, the utility establishes a Bluetooth connection to the card and retrieves the current BRV value from the card. Then the utility proceeds to have the cardholder authenticated to the card in the manner specified by the current BRV. If the user is successfully authenticated, the utility displays appropriate text in English (or a local language) to prompt the user to specify the new biometric authentication requirements. The utility asks the cardholder the following questions:

1. If he wants to remove any previously selected trusted device, i.e., a Class 2-device, whose ID/host name is displayed in the screen and adjacent to the question.
2. If he has one or more new companion mobile devices that he wants to add as trusted devices.

If an application requires operational data such as credit card account information of the user's credit cards, the utility also prompts the user to enter the required information.

Once the cardholder completes and confirms his answer for the prompted questions, the mobile app proceeds to determine the unique MAC address of the new trusted devices. If the cardholder specifies that the mobile device that runs this utility is a new trusted device, the utility queries the mobile device to determine its host name and unique Bluetooth MAC address. If none of the new trusted device(s) is the mobile device that runs this utility, the utility prompts the cardholder to turn on the Bluetooth feature of the additional devices, one device after another, so that it can detect the unique MAC address of each of these additional devices. The utility then proceeds to derive the new BRV from the cardholder's specifications and overwrites the current BRV of the on-card application with the new value. Next, the utility writes the updated/new MAC address of the new trusted devices and other operational data to the card's storage space allocated to the application. Of course, the new BRV and other operational data must be transmitted in an appropriate form—via encryption and/or requiring the digital signature mechanism—to insure privacy and integrity of the transmitted data.

Having discussed approaches for installing on-card applications and associated BRVs, as well as operational data on card 1, we next discuss the software component that runs on a host device interfacing with the smart card—the host software—to support an authorized application. As in the case of the on-card apps, the host software can be located on the card issuer's or a service provider's website, and installed on host devices such as smart phones, by users. When the host software of an authorized application runs on a host device for the first time, this software will perform the following process: (a) generates a public and private key pair for use with a public key algorithm that matches with the algorithm used on the card and (b) connects to a designated server, sending its public key, and requesting a public key certificate produced by the card issuer or a service provider, depending on the authorized application.

Upon a successful completion of the above process, the host software will have received its public key certificate and an accompanying root public key—the card issuer's public key. If the authorized application is provided by the card issuer, the public key certificate is signed by the card issuer. If the authorized application is provided by a service provider, the public key certificate is signed by the service provider, who, in turn, has a public key certificate signed by the card issuer. In the latter case, the host software would also receive the service provider's public key certificate.

Once the on-card applications are loaded with appropriate BRVs and operational data, the work flow of the card and interface devices in a supported application proceeds as follows:

1. The cardholder starts to engage in an application. For example, the cardholder has just walked to a kiosk in an immigration and customs area of an airport, or has just finished selecting merchandise at a store and is approaching a cashier/operator to start the checkout process. In either case, the kiosk or the cash register is referred to as the main interface device in this discussion.
2. If his card has a power switch, the cardholder turns the card on. The card then lights its LED in flashing blue to indicate that it is ready to function, and starts to query and detect surrounding Bluetooth devices. Or, if the card has no switch, it simply starts querying and detecting surrounding Bluetooth devices.
3. The main interface device compiles a list of legitimate cards it has discovered in its Bluetooth wireless range. There is no assurance that the cardholder will be instantaneously connected (via Bluetooth) with the main interface device at the kiosk that services him. Note that the Bluetooth-enabled devices that the main interface device detected include the smart cards as described here, but also include other devices such as cell phones of customers present in the area. Therefore, as part of the discovery service, the main interface device examines the Bluetooth profile(s) advertised by each discovered device and determines if the discovered device can function as an electronic passport, a payment transaction card, or has other desired functionality. If the discovered device functions in a role expected by the application, the main interface device places it on the list of legitimate cards that may be paired/connected to the main interface device via the Bluetooth protocol. Otherwise, the main interface device discards the MAC address of the non-relevant device.

4. The main interface device presents the operator the compiled list of legitimate cards that it discovered. It displays on its screen, one for each card on the list, a thumbnail image of the card's owner retrieved from each card. The thumbnail images can be sorted in alphabetical order of the last name of owner of the discovered cards, although the last names may not be displayed for privacy reason. To assist the main interface device in selecting the right card in the event the list is large, the initial of the last name of each cardholder may be displayed next to each thumbnail image. Note that the thumbnail image and/or the last name of a cardholder are retrieved from his card even before the cardholder authenticates himself to the card. This is necessary to allow for a quick selection of the right card for a cardholder. In certain societies, there may be a privacy concerns with this approach. An alternate method will be subsequently discussed to mitigate the privacy concerns. In any event, except for the cardholder's last name and thumbnail image, the card does not release any other information in response to requests from an interface device until a) the card has successfully authenticated the interface device, and b) the cardholder has successfully authenticated himself to the card. An exception to the second rule is the Emergency Medical Service (EMS) application, which is discussed below.

5. From the displayed list of the thumbnail images on the screen, the operator selects the one that visually matches with the cardholder standing at his device, and proceed to have the main interface device connects to the right card.

6. Once the main interface device connects to the right card, it transmits appropriate information, including the application ID and its public key certificate, to the card.

7. Upon receiving the application ID from the interface device, the card, which is a multiple-application card, loads the appropriate on-card app into its main memory for execution. For example, if the application ID indicates that it is an electronic passport application, the card loads an on-card app called ePassport into its memory. Next, the card sends the main interface device its public key certificate.

8. The card and the main interface device—through their respective software—perform a mutual authentication process. As part of this process, the card and the main interface device verifies the each other public key certificate, and they perform a challenge-response process. If the mutual authentication process is successful, a random AES session key is established and shared by the two devices. This key is used to protect privacy and integrity of data exchanged between the card and the main interface device. If the mutual authentication process fails, the main interface device informs the operator of the problem and the causes, so that appropriate actions can be taken.

9. The card then retrieves the BRV from its application storage and sends it to the main interface device. The BRV is accompanied by a cryptographic checksum to maintain its integrity.

10. Upon receiving the BRV from the card, the main interface device verifies its integrity by using the shared session key and the cryptographic checksum. Next, it prompts the cardholder to authenticate himself in the manner specified in the BRV.

As part of the cardholder authentication, the card may have to pair and connect to additional interface devices. For example, consider the case where the application is an electronic payment via a credit card account. If the BRV of this application permits the cardholder to perform an iris or facial verification via his trusted smart phone, the main interface device prompts the cardholder to connect his smart phone to the card and perform the required biometric verifications. However, prior to performing the biometric verifications, the card verifies that the MAC address of the just connected smart phone matches with one of the MAC addresses stored on the card as the address of trusted devices. If any of the above verification fails, the card issues appropriate error messages to the involved interface devices, and disconnects from the additional interface device that causes the error.

11. The card informs the main interface device of the cardholder authentication status. If the cardholder has been successfully verified, the main interface device requests a high resolution facial image of the cardholder and displays it for an additional visual verification by the operator. Obviously, visual verification usually does not work well in the case of twins, and it should never be considered as an independent biometric authentication factor. Depending on the application, the operator may perform additional tasks. For the electronic passport application, the operator may check the cardholder ID and the live biometric templates against those on the Terrorist list or the Black list. Additionally, the operator may retrieve past travel records stored on the card for various purposes. For government applications such as the electronic passport application, if cardholder authentication fails, the operator may notify appropriate security personnel to follow up and resolve the problem.

12. The card and the main interface device proceed to carry out the main tasks of the intended application. For example, if the application is an electronic payment with a credit card account stored on the card, the card sends the interface device the credit card number in an appropriately encrypted form. Note that some data will not be encrypted under a session key that was formed earlier. Since the credit card number is processed by a remote payment gateway, the card encrypts the credit card number under a key it shares with the payment gateway. This is to prevent a rogue merchant from modifying and/or faking a payment app, for example, on his smart phone, to use the session key to decrypt and steal the credit card number from a cardholder. The key that the card shares with the payment gateway can be established by the card in various ways, depending on specific payment gateways.

13. The operator writes logging information onto the card. If the application is an electronic passport application, the logging information could include airport name, airlines name, location of the immigration kiosk, timestamp, ID of the processing agent, etc. Even in the event of an authentication failure, the operator may still write the above logging info to the card, for auditing purpose. For all applications, the card automatically logs pertinent information about all the interface devices that it interacts with during the application, including device ID, Bluetooth MAC address, the type of biometric templates that the interface devices retrieved from the card, success/failure status of biometric verifications performed with each interface device, beginning and ending times (including date) of the Bluetooth communication session.

14. The main interface device terminates connection with the card. Depending on the application, the operator may shut down the app running on the main interface device or wait to process the next customer.

Note that throughout the above operation, for the version of the card that does not need the power-on switch, the cardholder need not take his card out of the wallet. This is a convenience that comes at the expense of the privacy concern mentioned in step 4 of the above operation.

Where this privacy concern must be addressed, an alternate method can be obtained as follows, at the expense of convenience:

At card-issuing or enrollment time, the card-issuing machine/computer obtains the 48-bit Bluetooth MAC address of the card being issued/enrolled, and encodes it in the form of a barcode. At the time when the card runs through a printer for printing information such as name, picture, the bar code is also printed on the back of the card. The barcode can be subsequently scanned by any device with an attached scanner or any mobile device with a built-in camera (smart phone, tablets, laptop), to obtain the 48-bit MAC address. A device can use this address to pair and connect to the card that has this address. Note that the barcode usually has an accompanied text (in English) for the encoded value. Thus, in the event the main interface device does not have a mean for reading the barcode, the operator can read the 12 printed English characters and supply it to the main interface device. Because a Bluetooth device always advertises its MAC address when it is in the discoverable mode, thus there is no security issue in printing the MAC address of a card on the back of its plastic.

Steps 3 to 5 of the above work flow can be modified as follows: When a cardholder approaches the operator of a main interface device, the operator asks the cardholder to present his card. Based on the printed facial image at the front of the card, the operator performs a quick visual verification. If the verification is OK, the operator uses a barcode scanner attached to the main interface device to scan the barcode printed on the back side of the card. The main interface device then decodes the barcode to obtain the wanted MAC address and uses this address to pair and connect with the right card.

As can be seen, there is no need to select the right card from a list, and a quick connection can be established. The inconvenience here is that the cardholders have to take their card out of their wallet. In this method, the card will not provide data for any request coming from an interface device until a) the card has successfully authenticated the interface device, and b) the cardholder has successfully authenticated himself to the card. Again, an exception to the second rule is the Emergency Medical Service (EMS) application, discussed below.

It can be seen that the described work flow (and its alternative) is virtually applicable to the cases where the main interface device is a self-service device, such as a self-checkout register in a supermarket.

Those skilled in the art will appreciate that the above embodiments have provided a novel method for using a new type of smart card in multiple applications. The method provides a common framework for biometric verification that various applications running on the card can use to meet the security needs of each application, without impacting other applications. The method provides a convenient mean to securely integrate the card with mobile devices capable of providing biometric services. As a result, a cardholder can authenticate himself to the card at a high level of security and reliability via multiple-factor biometric authentication.

While there are available in the marketplace various contactless smart cards that can operate with contactless readers to provide multi-factor biometric authentication, these readers are usually non-portable and expensive. The existing smart cards cannot integrate themselves with personal mobile devices that users carry with them all the time. Because Bluetooth is virtually ubiquitous among existing laptop and new mobile devices, the smart card we describe here enables various new types of smart card applications that can provide high mobility, yet with security and convenience.

The large storage capacity that the card of this invention provides sufficient storage to store various types of records, including medical records, X-ray, CT scan images, and other data throughout the lifetime of a cardholder, not just the lifetime of the card. When a card is near its expiration date, the cardholder can bring his current card to a designated registration office to obtain a new card. Prior to issuing the new card to the cardholder, the processing officers at the registration office can read official data stored on the current card and write it to the new card. Various procedures and software can be devised for the cardholders to transfer his own data, such as the payment records from previous payment transactions, from the current card to the new card.

Another benefit of the card described here is to provide automatic logging of information for security auditing purposes. For example, if desired, the card issuer can configure the card to log the MAC address of each interface device that the card interacts with during an application. Additionally, the time and date of the interaction can be logged. If a card is used 20 times a day for 365 days a year, about 100 Kbytes of storage are required to log this information for a year. This quantity of data is well beyond the storage capability of most existing smart cards, but is just a tiny fraction of storage that the card we describe here offers. The card can also provide a rich audit trail. For example, various logged records can be examined to find the devices that have been used to access a specific document. This audit capability is not available with existing portable storage devices such as USB flash or SD cards.

Another benefit of this invention is that it enables authorized emergency medical service (EMS) providers to access health records from the card, including insurance information, even if the cardholder cannot authenticate himself to the card. In one implementation, when a new health record is created for a cardholder, for example, a record that describes the medicines to which the cardholder is allergic, a health professional may ask if the cardholder wants to make the record available to an EMS provider. The records that can be reviewed by EMS providers are specially tagged and stored in the card. As in other authorized applications discussed previously, the on-card app for the health application can be installed by the card issuer at card-issuing or enrollment time, or by the cardholder at a later time, for example, after the cardholder has downloaded the on-card app and supporting utility. In an emergency situation, an emergency medical technician (EMT) can use a special device that is certified by either the card issuer or an authorized application provider, to access the required medical information from the card. The special device ("EMS device") includes a device certificate with a digital signature produced by either the cardholder or by a service provider certified by the card issuer. In the latter case, the EMS device also contains the service provider's certificate produced by the card issuer. The work flow of the card and the EMS device can be summarized as:

1. In an environment where there are many cards present, the EMT uses his EMS device to scan the back of the patient's card to get the MAC address and automatically connect to the patient's card. In a residential environment, the EMT may have been able to connect to the patient's card as soon as he reaches the front door.
2. Upon connection with the EMS device, the card examines the application ID and then loads the on-card health app into its memory for execution.
3. The card and the EMS device undergo a mutual authentication process as described above.
4. If verification is successful, the card examines the function field in the device certificate of the EMS device, to assure that it is authorized to access the needed information. If the function field indicates "EMS," the card releases to the EMS device those data that has been tagged as allowed for EMS purpose. The data exchanged between the card and the EMS device is encrypted by a session key formed between the two devices upon a successful result of the preceding mutual authentication process.

To minimize misuse if the EMS device is stolen, the service provider may require the EMT authenticate himself to the EMS device before it can be used to connect to the patient's card. The EMT can perform this authentication while on the way to the patient, using his own card with the EMS device.

Unlike existing smart cards that do not have sufficient storage to store the data of multiple applications, card 1 of this invention provides extra storage on the card for storing the cardholder's own data, e.g. electronic coupons, music files, or confidential documents. This extra storage, pre-allocated by the card-issuer at issuing or enrollment time, appears as a removable/mobile hard drive to a host computing device. The data on the mobile hard drive is controlled by an on-card app ("Mobile Drive App"), and other apps residing on the card will not be able to access this data. Users can store data on the mobile drive in clear form or in encrypted form.

The computer industry has provided users with various USB hard drives and flash drives, commonly referred to as secure drives, that have built-in hardware encryption capability to protect private data. Some of these secure drive products always encrypt data stored on them, while some allow users to partition the drive into an unprotected zone where data is stored in the clear, and a private zone where data is stored in encrypted form. An example of the first type of secure drive is the Maxtor BlackArmor, from Seagate Technology PLC; and an example of the second type of secure drive is the Kingston USB flash drive DataTraveler Locker, from Kingston Technology. Most of the secure drives require users to enter a password or pass phrase when they are configured or reconfigured for use. The password is used as a means to authenticate a user to the drive as well as for protecting private data. A secret cryptographic key is derived from the password and other variables, and subsequently used for symmetric encryption/decryption of data. When a user accesses an encrypted file, he needs to supply a correct password in order to retrieve the data correctly in the clear. In the Kingston DataTraveler Locker, in addition to choosing a password, the user selects the size for each of the two data zones and configures the drive before it can be used to store protected data.

Virtually all the existing secure drives suffer one or more the following disadvantages:

A user may forget his chosen password. Although the drive manufacturer may have provided security questions or hints to help users recover a forgotten password, many users chose simple questions whose answers are easy to guess. If a drive is lost or stolen, a clever adversary may be able to recover the password. Also, some users may ignore the password recovery procedure, rendering data unrecoverable at a later time when they forget the password.

The products use only one password or pass phrase, obviously to minimize the amount of secret information that users need to remember. This means that only one cryptographic key is used to encrypt all data stored on the drive or the private zone. If the password is compromised, all data on the drive or the private zone is compromised.

If a user wishes to change the password or to adjust the size of the two zones, the drive must be reconfigured and existing data on the drive is usually destroyed. To avoid destruction of existing data, the user must undergo the inconvenience of moving the data stored in the zones to a different drive for temporary storage, and then moving the data back after the reconfiguration.

Users see only one of the two zones at any given time. While switching from the private zone to the unprotected zone is easy, the reverse direction is more tedious as users need to enter a password or pass phrase. Furthermore, the storage may not be utilized efficiently. For example, if a user did not allocate storage for the two data zones appropriately, one frequently used zone may need more storage, while the surplus storage in the other zone is idle.

Our system eliminates the above problems. Instead of using password for authentication before accessing protected data, a cardholder/user authenticates himself to the card via by means of biometric verifications discussed earlier. When a file is created on the mobile drive of the card, the encrypted or non-encrypted attribute is tagged in the file descriptor. If the file contains encrypted data, the file descriptor also points to an appropriate entry in a key file, which contains random keys—one key for each encrypted file. Thus, when the on-card Mobile Drive Application writes private data to a new file, it generates a random key, storing the key to an entry in the key file. This indicates the encrypted status of the file as well as the key pointer in the descriptor of the newly created file, using the generated random key to encrypt the data before storing encrypted data in the file. When the Mobile Drive App retrieves a protected (encrypted) file, assuming the cardholder has been successfully authenticated, the app uses the file's descriptor to obtain the appropriate data-encrypting key, and then uses the obtained key to decrypt data. Because unprotected and encrypted files are tagged and managed, there is no need to have physical storage zones to mutually separate the two types of files.

To make it easier for a user to manage these files separately, for example, via a "file explorer," the component of the mobile drive application (or a driver) that runs on the host computing device can present the storage as if it were in two separate partitions (or drives): unencrypted and encrypted partitions. If a cardholder is comfortable that his host computing device is virus-free, he can enable both partitions to coexist without having to switch from one to another.

Another benefit of this invention is to enable the card to be adaptive to its surrounding environment, enabling it to operate the mobile drive (i.e., the extra storage allocated to users for storing their own files) in a mode that is safe for the data. When the card connects to a mobile device, e.g. a smart phone that belongs to a merchant, it checks the operational data of the Mobile Drive App to see if the MAC address of the mobile device matches with one of those on the list of trusted devices. If the mobile device is not a trusted device, the card configures itself so only the non-protected files are visible to the mobile device in the read-only mode. This protects the card against malwares and viruses running on non-trusted devices. Alternately, the access control policy can be even stricter by having the card make its own data not accessible. On the other hand, a cardholder may want to make it easy to share non-protected files with friends. To do so he can assign the mobile devices of his friends to be trusted devices. The cardholder can also configure the card so that no cardholder authentication is required for trusted devices to access to the non-protected data. This ability of the card to self-adjust the operational mode of its mobile drive when connecting with a surrounding device is beneficial. In contrast, the moment a mobile storage device such as an SD card or USB flash drive is inserted into a laptop or tablet, its storage spaces become writeable by default, rendering it vulnerable to virus infections that may not be detected by anti-virus software running on the host computing device. It is a widely known fact that, in many operating systems, it is non-trivial for an average user to configure a mobile/removable drive as a read-only drive.

The previously discussed means for installing authorized on-card apps as well as associated BRVs and operational data also apply to the Mobile Drive App.

Another benefit of this invention is a special mode for writing data, referred herein as the write-only (WO) mode. In this mode, an interface device can write data to the card (assuming any cardholder biometric authentication is satisfied), but the written data can only be read later by an authorized device whose public key certificate indicates such special access privilege. This is useful in situations where the cardholder wants to use the mobile drive on card 1 to receive data from a non-trusted device at an opportunistic time, but avoid spreading malware. At a later time, an authorized device with capability for scanning viruses can access the files that have the WO attribute. When this authorized device connects to card 1, the card will verify the public key certificate to ensure that it has such special access privilege. Once this authorized device retrieves those files and verified that they do not contain malware, it can convert the WO files to files with regular access attributes. To prevent a cardholder's trusted devices from accidentally accessing the files with the WO attribute, the cardholder generally will not request public key certificates with special access privilege for his trusted devices. Furthermore, the cardholder can configure the BRV in the Mobile Drive App to require deliberate confirmation before a device—even with the special access privilege—can read the WO files. For example, if an access to an unprotected file requires a one factor biometric authentication on the cardholder before it can be accessed, a two factor biometric authentication on the cardholder should be required before a special device can access the WO files.

The preceding description of the preferred embodiments of the invention includes numerous implementations details. It will be appreciated these are provided to enable a more complete understanding of the invention, whose scope is defined by the appended claims.

What is claimed is:

1. A smart card comprising:
a mass storage memory for storing biometric information of a user and private data;
a radio including Bluetooth radio circuit blocks;
an integrated circuit processor coupled to the mass storage memory and to the radio;
a battery connected to the integrated circuit processor, the mass storage memory and the radio;
a base layer upon which the mass storage memory, the radio, the processor, and the battery are disposed;
a top layer enclosing the mass storage memory, the radio, the processor, and the battery to thereby define a card; and
wherein:
the smart card is configured to load an application associated with an application identification signal received from a host device into the integrated circuit processor, the host device having host software to support an authorized application;
the smart card is configured to enable an user to perform an operation in which the user authenticates himself to the smart card by providing biometric information to the smart card; and
when the user of the smart card wishes to invoke an application for the private data, biometric information about the user is provided to the host device in communication with the smart card enabling the smart card to authenticate the user as an authorized user of the private data, and in response to that authentication provide the private data to the application.

2. A smart card as in claim 1 further comprising a power switch and a display built into the card; and wherein engaging the power switch activates the display to inform the user the card is on.

3. A smart card as in claim 1 wherein the biometric data of the user is placed on the card by a trusted issuer and the private data is stored on the card by the user.

4. A smart card as in claim 1 wherein the private data is decrypted by the processor before being supplied to the application.

5. A smart card as in claim 1 wherein the mass storage comprises at least 10 megabytes of flash memory and the radio transmits and receives data using a Bluetooth protocol.

6. A smart card as in claim 1 wherein:
the biometric information includes a fingerprint of the user;
the card further includes a fingerprint sensor in the top layer of the card; and
a fingerprint of the user authenticates the user as an authorized user of the encrypted data.

7. A smart card as in claim 1 wherein the device in communication with the card comprises a portable electronic biometric sensing device having a radio, and radio communication between the portable electronic device and the card authenticates the user as an authorized user of the private data.

8. A smart card as in claim 7 wherein the portable electronic biometric sensing device comprises a cellular telephone.

9. A method of using a smart card for a transaction comprising:
a user bringing the smart card in proximity to a radio to enable the card to be detected by a main interface device;
the main interface device compiling a list of discovered devices emitting the radio signals;
the main interface device determining if each discovered device functions in a role expected by an application running on the main interface device;
the main interface device discarding irrelevant devices from the list;
for each discovered device remaining on the list, the main interface device requesting a thumb nail image of the user for displaying on a screen of the main interface device, wherein if a discovered device has no thumbnail image, the main interface device discards it off the list;

an operator of the main interface device visually comparing facial features of the cardholder with the thumbnail image displayed on the screen, wherein if the visual comparison matches, the operator selects the cardholder's smart card for the main interface device to connect to;

the main interface device transmitting to the connected smart card an application identification signal and authorization information;

within the smart card loading an appropriate application associated with application identification signal into a processor;

between the smart card and the main interface device performing a mutual authentication process;

if the mutual authentication process is successful then transmitting from the smart card to the main interface device biometric information about an authorized user of the smart card;

performing an operation in which the user authenticates himself to the smart card by providing biometric information to the smart card; and if the user is authenticated, the smart card transmitting data stored on the smart card to the main interface device the discovered device.

10. A method as in claim 9 wherein the step of performing an operation in which the user authenticates himself to the smart card by providing biometric information to the smart card further comprises connecting the smart card to a sensor not on the smart card which collects the biometric information from the user.

11. A method as in claim 9 wherein the step of performing an operation in which the user authenticates himself to the smart card by providing biometric information to the smart card further comprises using a sensor on the smart card to detect biometric information from the user.

12. A method as in claim 10 wherein when connecting the smart card to a sensor prior to performing the biometric verifications, the smart card first verifies that a characteristic of the sensor is stored in the smart card to enable the smart card to authenticate the sensor.

13. A method as in claim 12 wherein the characteristic comprises a MAC address (media access control address) of the sensor and the verification includes comparing the MAC address of the sensor with a list of MAC addresses stored on the smart card.

14. A method as in claim 9 wherein the smart card includes a power switch, and the step of bringing the smart card in proximity to a radio to enable the card to detect the radio signals and thereby discover devices is not performed unless the user activates the power switch.

15. A method as in claim 9 wherein the smart card and the discovered device each have a certificate and as a part of the step of performing a mutual authentication process, a challenge-response process is performed.

16. A method of using a smart card, comprising:

using a scanner attached to a main interface device to scan a Bluetooth MAC (Media Access Control) address printed on a plastic surface of a smart card for the main interface device to obtain the Bluetooth MAC address of the smart card;

the main interface device transmitting to the smart card an application identification signal and authorization information;

within the smart card loading an appropriate application associated with application identification signal into a processor;

between the smart card and the main inter face device performing a mutual authentication process;

if the mutual authentication process is successful then transmitting from the smart card to the main interface device biometric information about an authorized user of the smart card;

performing an operation in which the user authenticates himself to the smart card by providing biometric information to the smart card; and if the user is authenticated, then the smart card transmitting data stored on the smart card to the main interface device.

17. A method as in claim 16 wherein the Bluetooth MAC (Media Access Control) address of the smart card is printed as a barcode.

18. A method as in claim 16 wherein the Bluetooth MAC (Media Access Control) address of the smart card is printed as a QR code (Quick Reference Code).

* * * * *